United States Patent [19]
Pond

[11] 3,820,525
[45] June 28, 1974

[54] RADIATION AND CONVECTION HEATED OVEN

[76] Inventor: John E. Pond, 17238 Barneston St., Granada Hills, Calif. 91344

[22] Filed: Aug. 10, 1973

[21] Appl. No.: 387,325

[52] U.S. Cl............... 126/21 A, 219/400, 219/411
[51] Int. Cl............................................. A21b 1/06
[58] Field of Search ... 126/21 A; 219/400 X, 411 X

[56] References Cited
UNITED STATES PATENTS

| | | | |
|---|---|---|---|
| 3,304,406 | 2/1967 | King................................ | 219/400 X |
| 3,313,917 | 4/1967 | Ditzler et al.................. | 126/21 A X |
| 3,324,844 | 6/1967 | Huffman........................... | 126/21 A |

*Primary Examiner*—Edward G. Favors
*Attorney, Agent, or Firm*—Lyon & Lyon

[57] ABSTRACT

A radiation and convection heated oven in which infrared radiant heat is generated by one or more sets of coplanar positioned heaters, the radiation from each set of heaters being directed through a transparent reradiating panel, such as a fused quartz panel, forming a wall of an oven chamber. The oven chamber is provided with a plurality of shelves also transparent to the radiant heat and supporting heat absorbing containers. The radiation passing into the oven chamber being distributed in an essentially uniform pattern by reflecting surfaces for absorption by the containers as well as the exposed surfaces of food contained therein. Simultaneously, air is circulated past the set or sets of heaters and the transparent panels and around the food containers to control excess radiant temperatures and supplement the radiant heat applied to the food.

7 Claims, 5 Drawing Figures

RADIATION AND CONVECTION HEATED OVEN

BACKGROUND OF THE INVENTION

Radiant heat in the infrared range has been used in food cooking ovens, as exemplified by the following U.S. Pat. Nos. 1,652,438, 2,134,474, 2,571,218, 3,152,243, 3,329,139, 3,518,981, 3,548,153.

The source of the radiant heat is maintained at a much hotter temperature than the temperature to which the food is cooked. Usually a single relatively compact source is used. As a result, uniform distribution of heat in the region occupied by the food undergoing cooking is difficult to attain, particularly, if the food is distributed among several containers disposed on separate shelves. As a result, a more common form of oven cooking involves convection heating in which air is circulated around the food and it's container.

SUMMARY OF THE INVENTION

The present invention is directed to radiation and convection heated ovens and is summarized in the following objects:

First, to provide an oven having a plurality of shelves for receiving a plurality of heat absorbing containers wherein heat is supplied simultaneously as infrared radiant energy and by convection currents in such a manner that the contents of each food container is cooked essentially the same irrespective of its location in the oven.

Second, to provide an oven wherein two opposed sets of infrared radiant sources are located at opposite sides of an oven chamber but separated from the oven chamber by transparent panels through which radiant energy is transmitted; the oven chamber having reflecting surfaces to effect uniform exposure of the food containers and their contents to radiant energy, each container having radiant energy absorbing walls for transfer of heat to its contents.

Third, to provide an oven, as indicated in the preceeding objects, wherein the radiant sources and transparent panels define air passages communicating with opposite ends of the oven chamber; the food containers are arranged on shelves defining horizontal air passages between the opposite ends of the oven chamber; and circulating means is provided at the ends of the oven in such a manner that the air passages within the oven chamber and externally of the oven chamber are subjected to uniformly distributed circulation of air.

Fourth, to provide a radiation and convection heated oven, as indicated in the preceeding objects which is particularly adapted for the use of gas operated radiant sources.

The radiant and convection heated oven is contained in a housing structure 1 and includes insulated side walls 2, an insulated back wall 3 and an insulated door 4.

Figure 5:
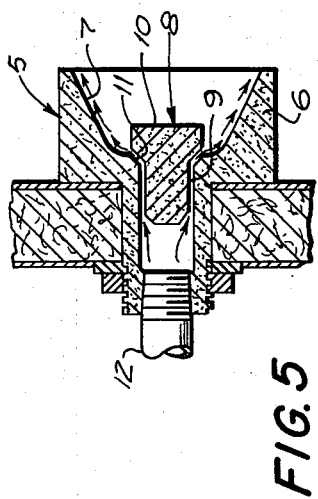
FIG. 5 is an enlarged fragmentary sectional view taken through 5—5 of FIG. 3 showing one of the radiant heater units.

Mounted in each of the side walls 2 and arranged rows and columns is a set of heat radiating units 5. The heat radiating units are preferably of the gas burner type. As shown in FIG. 5, each unit includes a ceramic shell 6 suitably secured in the side wall. The end of the shell confronting the oven forms a cup shape chamber 7. Fitted in the base end of the chamber 7, is a distributor nozzle 8 having longitudinal grooves 9. The nozzle is provided with a head 10 having a bevel surface 11 so that a mixture of air and gas may be deflected against the surface of the chamber 7 and burned. This type of radiant gas burner is in itself conventional. Each radiating unit is provided with a supply fitting 12 which in turn is connected to a gas supply system, not shown. The supply system is conventional and includes means for introducing air to produce a combustible mixture.

Disposed in front of each set of radiating units 5 is a reradiating panel 13. These panels may be formed of transparent fused quartz. Each panel is supported by a suitable mounting frame 4, the ends of which are spaced from the insulated end wall 3 and insulated door 4. Between the rear ends of the frames 14 and the insulated end walls 3 is mounted a plurality of circulating fans 15 mounted on drive shafts 16 and driven by conventional means, not shown. The fans 15 force air between the sets of radiating units and their respective panels 13, the air passes around the front ends of the mounting frames 14. The inward surface of the insulated door 4 is curved to form a deflecting surface 17. Similarly, the inward surface of the end wall 3 is curved to form a deflecting surface 18. In addition heat transfer fins 19 may be provided between the heat radiating units 5.

Reradiating panels 13 form therebetween an oven chamber in which are mounted a stack of shelves 20, preferably formed of transparent fused quartz. The side margins of the shelves may be supported by horizontal channel members 21 secured to the mounting frames 14. The shelves support food containers 22 preferably rectangular with vertical sides and open at their upper sides. The food containers are formed of heat conducting material and their surfaces are coated or oxidized in a manner to be heat absorbent.

Mounted between the channel members 21 and the reradiating panels 13 is a pair of deflecting panels 23 which comprise a plurality of horizontal vanes 24 which are angularly disposed so as to deflect heat rays passing through the panels 13 in directions which tend to effect uniform distribution of radiant rays and impingement of these rays on the various containers.

Figure 1:
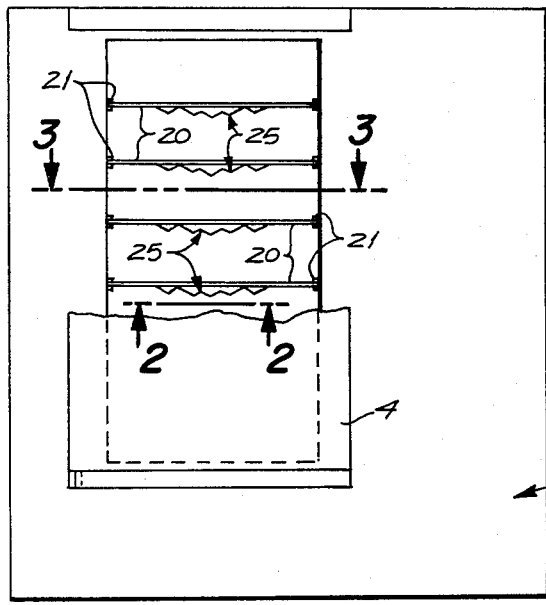
FIG. 1 is a front view of the radiant and convection heated oven with a portion of the door removed.
Figure 2:
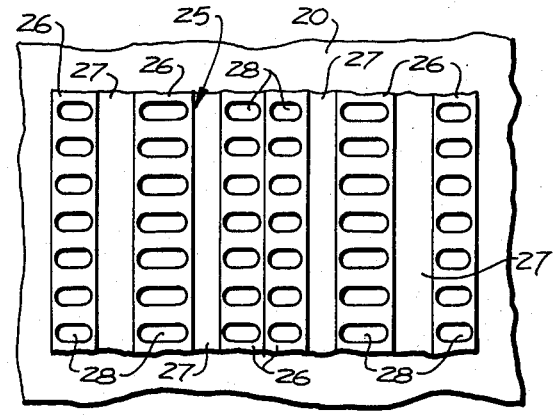
FIG. 2 is an enlarged fragmentary sectional view taken through 2—2 of Figure showing a deflecting panel.
Figure 3:
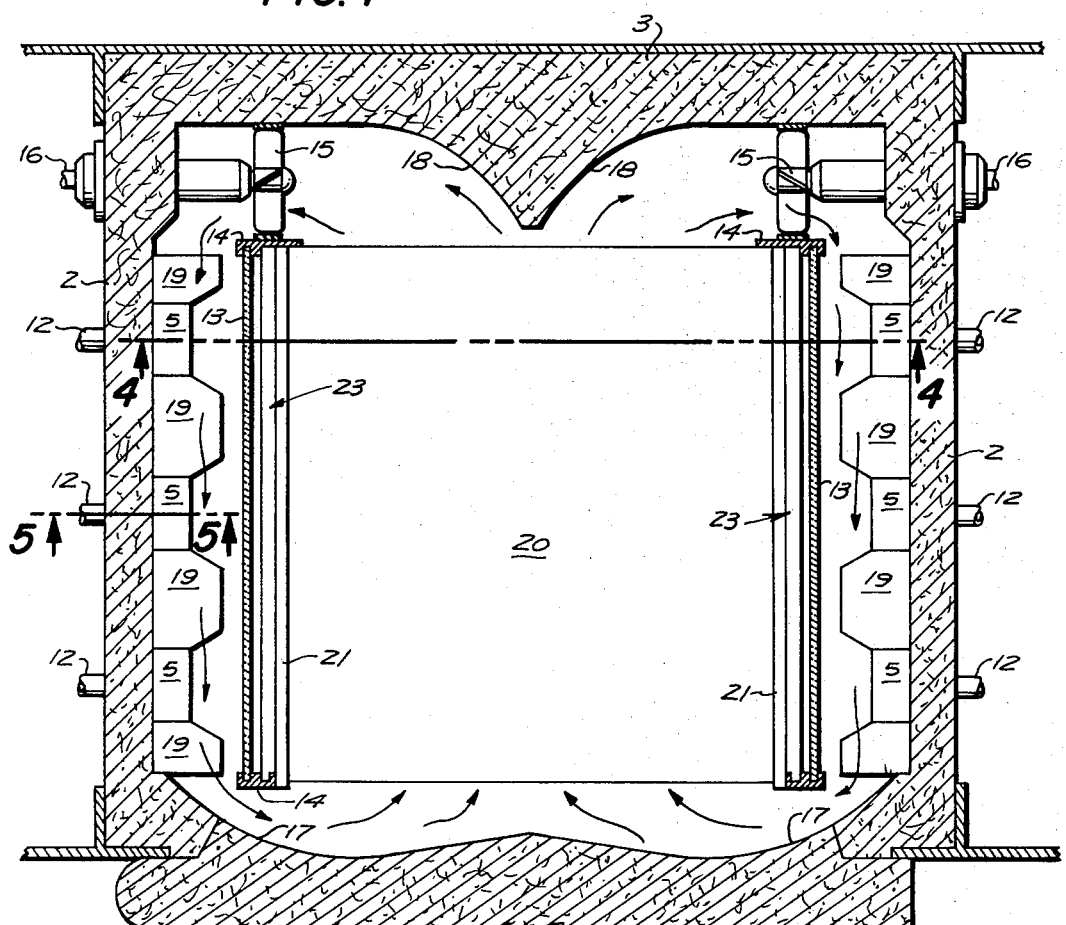
FIG. 3 is an enlarged fragmentary essentially diagrammatical sectional view taken in the plane of 3—3 of FIG. 1.
Figure 4:
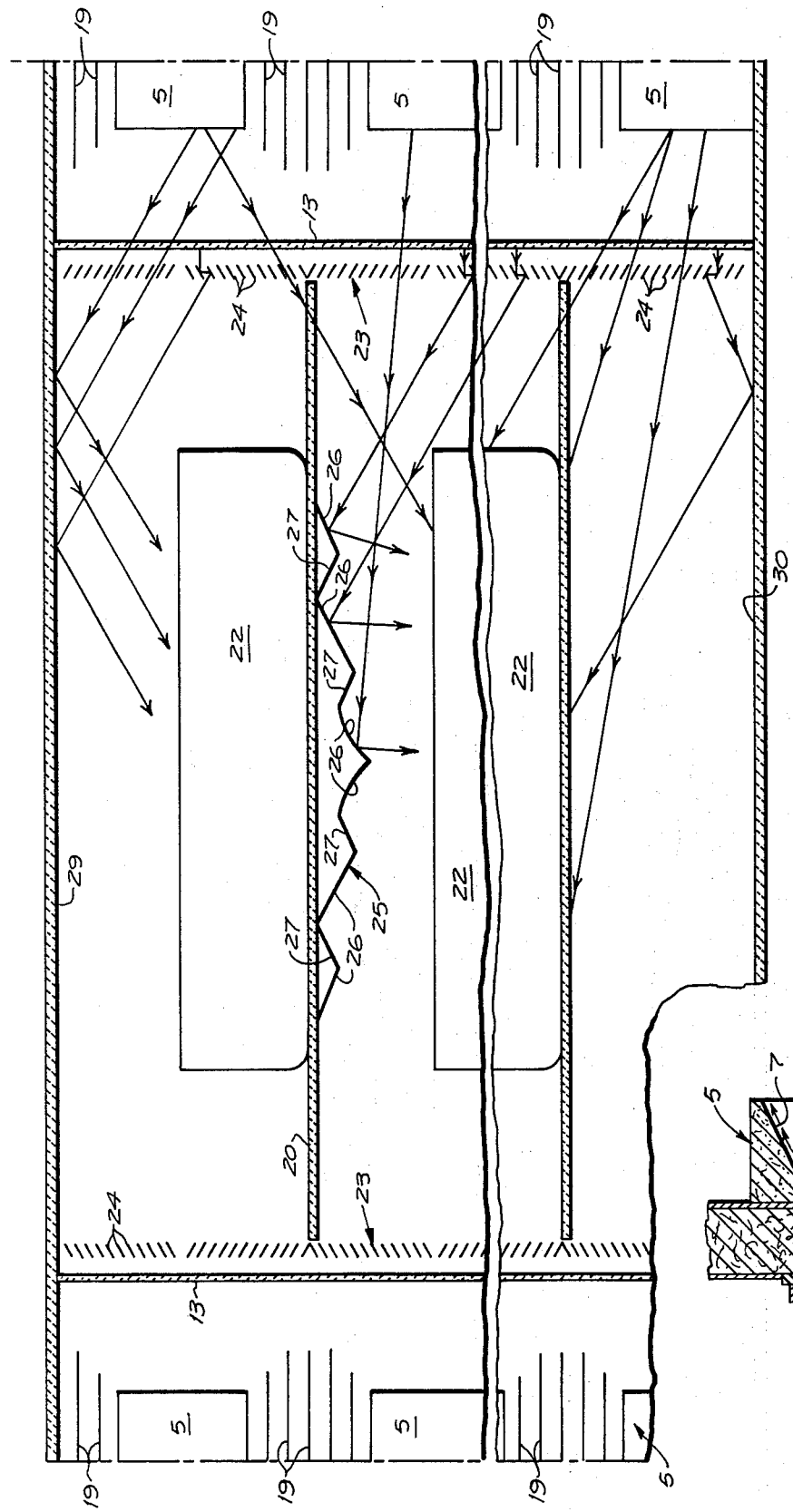
FIG. 4 is a further enlarged essentially diagrammatical fragmentary sectional view taken through 4—4 of FIG. 3.

Under each of the shelves, except the bottom shelf is mounted a deflecting plate 25 comprising deflecting strips 26 disposed curved so as to deflect rays passing through the deflecting panels 23 onto the surface of food in the container below. The deflecting strips 26 are separated by connecting strips 27 which are located essentially parallel to the rays which impinge on the deflecting strips 26. To increase the efficiency, the deflecting vanes 24 and the deflecting strips 26 are provided with highly reflective surfaces. In order that a predetermined portion of the rays directed toward the bottom surfaces of the containers the deflecting strips 26 may be provided with slots 28 as shown in FIG. 2.

The oven chamber is provided with a top wall 29 the surface of which is highly polished so as to form a deflecting surface directing heat rays onto the contents of the uppermost food container. Similarly, the bottom side of the oven chamber is provided with a deflecting member 30 which directs the rays against the underside of the lowermost food container.

Operation of the radiation convection gas oven is as follows:

To prepare the oven for operation, the radiating units 5 are ignited and the circulating fans 15 set in operation. The radiating units 5 heat the reradiating panels 13 so that radiant energy is uniformly distributed throughout the areas of the two panels 13. Radiant heat from these panels pass between or are reflected from the vanes 24 into the oven space.

The food to be cooked is placed in the food containers 22 which are formed of heat conductive material and have a heat absorbing outer surface, the upper sides of the food containers are open, that is, the food therein need not be covered, however a cover of heat transmitting material having a heat absorbing surface may be used. The containers may be dimensioned to fill the shelves 20 leaving sufficient side space to provide the desired distribution of the radiant energy passing the deflecting panels 23. However, if desired, several similar containers may be placed on each shelf. The deflecting plates 25 disposed under each shelf and the slots therein divide the heat rays so that a portion is directed onto the contents of the container below and a portion is directed to the underside of the container above.

Operation of the circulating fans 15 causes air to pass in between the radiating units 5 and reradiating panels 13 as well as the fins 19. The heated air is reflected into the oven space by the inner surface 17 of the door and flows around and over the food containers as well as the shelves deflecting plates 25 and vanes 24 and then is redirected by the air deflecting surface 18 for recirculation. It will thus be seen that the circulating air also performs the function of preventing overheating of the radiating units 5, the reradiating panels 13 and other parts of the radiating system as well as the shelves 20. The combined effect of the radiation rays and the circulating air provides uniform distribution of heat so that the contents of all of the containers receive the same amount of heat.

Having fully described my invention it is to be understood that I am not to be limited to the details herein set forth, but that my invention is of the full scope of the appended claims.

I claim:

1. A radiation and convection heated oven, comprising:
   a. means defining an oven cavity having at least one radiant energy transmitting partition and a plurality of shelves for supporting food containers;
   b. a set of infrared radiant heaters arranged in rows and columns outwardly of said partition to produce a field of essentially uniformly distributed radiant energy for transmission through said partition wall into the oven chamber;
   c. means for circulating air past the radiant heaters and between the shelves whereby the food containers are subjected to radiant heat and convection heat;
   d. a first set of radiant energy deflecting surfaces disposed within the oven chamber adjacent the radiant energy transmitting partition;
   e. and a second set of deflecting surfaces disposed under selected shelves for directing radiant energy onto the contents of the container below.

2. An oven as defined in claim 1, wherein:
   a. the containers have a radiant energy absorbing surface;
   b. the shelves are transparent to the radiant energy;
   c. and each of the second sets of deflecting surfaces is perforated to pass radiant energy for transmission through the corresponding shelf to the container supported thereon.

3. A radiation and convection heated oven, comprising:
   a. distributed infrared radiant heating means, forming opposed vertical walls;
   b. a partition confronting each of the radiant heating means in spaced relation thereto, each partition being transparent, to the radiation therefrom; the partitions forming therebetween an oven chamber;
   c. a plurality of shelves disposed in the oven chamber between the partitions, the shelves also being transparent to radiation from the radiant heating means;
   d. a plurality of containers having radiant energy absorbing walls carried by the shelves;
   e. the oven chamber having end walls spaced from the partitions to form therewith passages for air circulation horizontally past the heater means and through the oven chamber between the shelves;
   f. and means for effecting said horizontal air circulation.

4. An oven as defined in claim 3, wherein:
   a. a panel is disposed in the oven chamber adjacent each partition and includes radiant energy deflecting vanes for controlling distribution of radiant energy to the containers.

5. An oven as defined in claim 3, wherein:
   a. radiant energy deflecting means is disposed under selected shelves for directing radiant energy onto the contents of containers disposed on the shelf below.

6. An oven as defined in claim 5, wherein:
   a. the deflecting means is slotted to pass a portion of the radiant energy for absorption by the container above.

7. A radiation and convection heated oven, comprising:
   a. means defining an oven cavity having at least one radiant energy transmitting partition and a plurality of shelves for supporting food containers;
   b. a set of infrared radiant heaters arranged in rows and columns outwardly of said partition to produce a field of essentially uniformly distributed radiant energy for transmission through said partition wall into the oven chamber;
   c. means for circulating air past the radiant heaters and between the shelves whereby the food containers are subjected to radiant heat and convection heat;
   d. and radiant energy deflecting vanes disposed adjacent the transmitting partition for directing the radiant energy against the containers.

* * * * *